UNITED STATES PATENT OFFICE.

OSKAR ZAHN, OF BERLIN, GERMANY.

PROCESS OF MAKING SODIUM SULFATE AND SULFURIC ACID.

No. 921,329.

Specification of Letters Patent. Patented May 11, 1909.

Application filed October 28, 1907. Serial No. 399,403.

*To all whom it may concern:*

Be it known that I, OSKAR ZAHN, a subject of the Austrian Emperor, residing at Berlin, Prussia, German Empire, have invented certain new and useful Improvements in Processes of Manufacturing Sodium Sulfate and Sulfuric Acid, of which the following is a specification.

The subject of my invention is a process of manufacturing sulfate of soda and sulfuric acid from bisulfate of soda.

My invention consists in converting the sodium bisulfate into sodium sulfate and hydrated sulfuric acid by the addition of water, and in then evaporating the acid and calcining the sulfate obtained.

A process is already well known according to which there is added to the sodium bisulfate so much water that the resulting sulfate can crystallize. For this purpose, for each molecule of sodium sulfate ten molecules of water would be necessary, apart from the quantity of water requisite for producing hydrated sulfuric acid. In this process the crystals obtained are separated from the sulfuric acid and each substance used separately. In order to obtain calcined sulfate by this process, the crystallized salt would have to be deprived of its water of crystallization in a special furnace. Only if this were done, could calcined sulfate be obtained.

According to my new process, on the contrary, I only add such quantity of water as permits of hydrated sulfuric acid being produced. Thus any excess of water, which might serve as water of crystallization, is altogether avoided.

The advantage of my improved method is that the mixture of hydrated acid and sulfate can be introduced direct into the furnace, without its being necessary to drive off water of crystallization. By this means fuel is essentially economized, and what is of still more importance, there results a great saving of time and wages, owing to there being no intermediate operation required.

My new process might, for instance, be carried out as follows:—The bisulfate (say 100 kilograms) is broken into pieces and placed in an iron pan, resembling those used for sulfate furnaces, and worked up with, say, from 6—7 kilograms of water, and thus dissolved. The pan may be adequately heated for the purpose. In the course of the process a part of the hydrated sulfuric acid escapes. The reaction-mixture gradually assumes a pasty consistency and can then be transferred to a roaster, in which the sulfate is calcined.

As already explained, in my new process there is no bisulfate introduced into the furnace, but only sulfate, mixed with a small quantity of sulfuric acid. There is thus no appreciable wear and tear of the material of the furnace, whereby the process is rendered very economical.

The temperatures used in the carrying out of the process are as follows: in the iron pan about 150-200 degrees, in the roaster about 1000 degrees.

Having thus described my invention, what I claim as new and desire to secure by Letters Patent is—

The process of manufacturing sodium sulfate and sulfuric acid, consisting in decomposing sodium bisulfate, with the aid of water, into sodium sulfate and hydrated sulfuric acid, and in heating the same to drive off this acid and to calcine the sulfate, substantially as described.

In testimony whereof I affix my signature in presence of two witnesses.

OSKAR ZAHN.

Witnesses:
 HERMANN BREY,
 OTTO STEUER.